United States Patent Office 2,916,479
Patented Dec. 8, 1959

2,916,479

POLYMERISATION PROCESS

Philip Aldwyn Jenkins, Ashtead, and Alaric Louis Jeffrey Raum, Teddington, England, assignors to The Distillers Company Limited, Edinburgh, Scotland, a company of Great Britain No Drawing. Application November 19, 1956
Serial No. 622,768

Claims priority, application Great Britain
December 7, 1955

3 Claims. (Cl. 260—94.9)

The present invention relates to a process for the polymerisation of ethylene to give linear polymers having high molecular weights, which polymers are of great utility for the preparation of films, fibres, moulded articles and the like. It relates particularly to a process for the production of high molecular weight linear polyethylenes under mild conditions of temperature and pressure.

Hitherto the commercially practical processes for the polymerisation of ethylene to give resins of technical importance have involved the use of high temperatures and very high pressures.

It has been proposed to form high molecular weight polymers of ethylene by processes which comprise contacting gaseous ethylene with a catalyst system consisting of a mixture of aluminum trialkyls or of organic derivatives of aluminium having the formula $R_2AlX$ or organic derivatives of magnesium or zinc in conjunction with a compound of a metal of groups IVa to VIa of the periodic table. In the above formula R is hydrogen or a hydrocarbon radical or residue and X is hydrogen, a halogen atom, an alkoxy group, an aryloxy group, a radical derived from a secondary amine, a secondary amide, a mercaptan, a thiophenol, a carboxylic acid or a sulphonic acid. The organic derivatives of zinc and magnesium mentioned in these prior proposals are the di-alkyl derivatives and Grignard-type compounds.

These processes yield valuable products but many of the organo-metallic compounds present in the catalyst system are relatively difficult to synthesise. Moreover, many of the compounds are not stable or easily handled.

An object of the present invention is to provide a process for the production of high quality, high molecular weight polyethylene by a process which involves the use of a new catalyst system. It is a further object to provide a process whereby the polymerisation of ethylene may be effected rapidly under mild conditions of temperature and pressure.

Accordingly, the present invention is the process for the production of polyethylene which comprises contacting ethylene with a catalyst system formed by mixing a calcium or barium compound having the formula Ar—M—X, as herein defined, with a titanium, zirconium or vanadium halide.

In the formula Ar—M—X, M is the divalent calcium or barium ion, Ar is an aromatic residue directly bonded through a carbon atom of the aromatic nucleus to the metallic ion and X is a halide group, ie. fluoride, chloride, bromide or iodide. The preferred aromatic residues are the hydrocarbon residues such as the phenyl, tolyl and naphthyl residues.

Any titanium, zirconium or vanadium halide can be employed and most suitably the chlorides of these metals in their tri- or tetra-valent form are used. Titanium tetrachloride, vanadium tetrachloride, zirconium tetrachloride and titanium trichloride, when prepared as described in our copending British application No. 13,317/56, form particularly valuable catalyst systems according to the present invention.

The proportion of the calcium or barium compound to the halide compound is not critical. It is preferred that the catalyst system should contain molar excess of the calcium or barium compound over the halide compound present and most suitably at least two molar proportions of the former compound are employed to each proportion of the latter compound.

The preparation of the catalyst system by mixing the calcium or barium compound with the halide compound and the subsequent polymerisation are preferably carried out in the absence of molecular oxygen, carbon dioxide and water. Most suitably all reactions are carried out in an atmosphere of ethylene. An inert gas such as nitrogen can be used to flush out the polymerisation vessel prior to the admission of the various components of the reaction mixture. The catalyst systems and/or their components are destroyed by reaction with oxygen, carbon dioxide or water and, consequently, if any of these are present in excess little or no polymerisation will take place. Small quantities of oxygen, carbon dioxide or water are removed by reaction with part of the catalyst system or its components and any undestroyed catalyst left after this reaction initiates polymerisation in the usual way.

The polymerisation reaction is most suitably carried out with the components of the catalyst system dispersed or dissolved in an inert liquid vehicle through which ethylene can be passed. Most suitably the inert liquid vehicle consists of a solvent for one of the compounds which react together to make the catalyst system and for ethylene. Examples of the preferred liquid vehicles are aliphatic, cycloaliphatic and hydrogenated aromatic hydrocarbons such as pentane, hexane, cyclohexane, tetrahydronaphthalene, decahydronaphthalene, the higher paraffins, and mixtures thereof. Aromatic hydrocarbons such as benzene and xylene, halogenated aromatic hydrocarbons such as ortho-dichlorbenzene and chlorinated naphthalene and mixtures thereof can also be employed but fully saturated compounds are preferable. The quantity of solvent employed may be varied considerably and should be such that the final recovery of the polyethylene is facilitated.

The process of the present invention can readily be brought about by mixing the two components forming the catalyst system with an inert liquid vehicle in a suitable vessel and then allowing ethylene to enter the vessel. Alternatively the components of the catalyst system can be mixed in the presence of the ethylene. In this case one of the two components of the catalyst system may first be mixed with a suitable liquid vehicle, for instance, one of those mentioned above, and the liquid mixture then saturated with ethylene. The other component of the catalyst system is then added when it will be found that rapid polymerisation of ethylene takes place and further quantities of ethylene may be passed into the reaction mixture and polymerised.

The activity of any catalyst system according to the present invention is dependent upon the components used. With very active systems the polymerisation may be initiated at normal ambient temperatures or below, for instance at 10° C., while with less active systems elevated temperatures are required. With any particular catalyst system the rate of polymerisation is increased by raising the temperature of the reaction mixture, but normally it is undesirable to employ temperatures above about 150° C. It should be noted that above such a temperature there is a danger that the efficiency of the catalyst systems may be reduced and perhaps destroyed. A convenient temperature range within which the polymerisation may be carried out at a useful rate is 100°–150° C.

When the polymerisation is to be carried out at an elevated temperature, the mixture forming the catalyst system can be heated either before or after the introduction of the ethylene.

It is unnecessary to employ elevated pressures in order to bring about the polymerisation of ethylene according to the present invention. However, for convenience of handling gaseous ethylene it is advantageous to employ slightly elevated pressures and preferably the present process is carried out with the ethylene under a pressure in the range 50-500 pounds per square inch gauge (p.s.i.g.).

The method by which the polyethylene produced according to the present invention is recovered from the reaction mixture and worked into a final form is not critical. However, it is advantageous to include a mineral acid washing stage in the working up in order to remove inorganic contaminants.

The process may be carried out batchwise or continuously and by its use high yields of high grade polyethylene can be produced.

The following examples illustrate embodiments of the process of the present invention. The parts by weight (p.b.w.) and the parts by volume (p.b.v.) bear the same relationship to each other as do grams to millilitres.

Example 1

Phenyl calcium iodide was prepared by reacting 4.25 p.b.w. of calcium with 27.5 p.b.w. of iodobenzene in diethyl ether solution. 100 p.b.v. of toluene were added and the diethyl ether removed by distillation. The mixture was transferred to a glass tube and thoroughly mixed with 5 p.b.w. of titanium tetrachloride. The tube was then placed in a steel reactor having a capacity of 300 p.b.v. and after the air had been pumped out, ethylene admitted at a pressure of 200-250 p.s.i.g. The reactor was shaken at intervals and more ethylene admitted as necessary to maintain the pressure. After the reaction had been allowed to proceed for 20 minutes at room temperature, the temperature of the reactor was raised to 150° C. at which level it was maintained for 25 minutes. The reactor was then cooled, the ethylene pressure released and the tube removed.

The contents of the tube were then treated with ethyl alcohol and concentrated hydrochloric acid and filtered leaving a residue of polyethylene which was purified by further treatment with alcoholic hydrochloric acid.

A good yield of pure white, high molecular weight, linear polyethylene was obtained which could be pressed at 150° C. to give a tough transparent flexible film.

Example 2

The process of Example 1 was repeated but no external heating of the steel reactor was employed. The reaction mixture was well agitated and the reaction allowed to proceed for 2½ hours. A good yield of polyethylene was obtained which had similar properties to polyethylene of Example 1.

Example 3

The process of Example 1 was repeated but the phenyl calcium iodide was replaced with phenyl barium iodide prepared from 4 p.b.w. of barium and 10 p.b.w. of iodobenzene. A good yield of high molecular weight, linear polyethylene was obtained.

We claim:

1. A process for the production of polyethylene which comprises contacting ethylene with a catalyst system formed by mixing a compound having the formula Ar—M—X with a halide selected from the group consisting of titanium, zirconium and vanadium halides, wherein said formula M is a divalent ion selected from the group consisting of calcium and barium ions, Ar is an aromatic residue directly bonded through a carbon atom of the aromatic nucleus to the metallic ion and X is a halogen atom.

2. A process as claimed in claim 1, wherein the halide is a chloride.

3. A process as claimed in claim 1, wherein the halide is titanium tetrachloride.

References Cited in the file of this patent

UNITED STATES PATENTS

| | | |
|---|---|---|
| 2,721,189 | Anderson et al. | Oct. 18, 1955 |
| 2,827,446 | Breslow | Mar. 18, 1958 |
| 2,839,518 | Brebner | June 17, 1958 |